(12) United States Patent
Hecht (10) Patent No.: US 8,708,610 B2
(45) Date of Patent: Apr. 29, 2014

(54) CUTTING BODY AND CUTTING INSERT HAVING A STOPPING RECESS FOR A ROTARY CUTTING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 350 days.

(21) Appl. No.: 13/240,193

(22) Filed: Sep. 22, 2011

(65) Prior Publication Data

US 2012/0082519 A1 Apr. 5, 2012

(30) Foreign Application Priority Data

Oct. 5, 2010 (IL) .......................................... 208494

(51) Int. Cl.
 *B23C 5/22* (2006.01)
(52) U.S. Cl.
 CPC .................................. *B23C 5/2221* (2013.01)
 USPC .............................................. 407/40; 407/50
(58) Field of Classification Search
 USPC .............. 407/40, 41, 42, 49, 50, 61; 144/218, 144/227, 229, 230, 235, 241
 See application file for complete search history.

(56) References Cited

U.S. PATENT DOCUMENTS

| 3,447,578 | A | * | 6/1969 | Mitten ........................... 144/218 |
| 3,887,975 | A | * | 6/1975 | Sorice et al. .................... 407/47 |
| 4,417,833 | A | * | 11/1983 | Wertheimer .................... 407/61 |
| 4,558,974 | A |   | 12/1985 | Pano |
| 4,580,930 | A | * | 4/1986 | Zinner .......................... 407/110 |
| 5,803,675 | A | * | 9/1998 | Von Haas ...................... 407/107 |
| 6,234,727 | B1 |   | 5/2001 | Barazani |
| 7,163,361 | B2 |   | 1/2007 | Hecht |
| 2005/0207854 | A1 |   | 9/2005 | Hecht |
| 2008/0298922 | A1 |   | 12/2008 | Oettle |

FOREIGN PATENT DOCUMENTS

| DE | 31 19 834 A1 | 12/1982 |
| DE | 10 2006 001747 A1 | 7/2007 |
| DE | 10 2006 055255 A1 | 6/2008 |
| WO | WO 2005/087415 | 9/2005 |
| WO | WO 2010/078672 | 7/2010 |

OTHER PUBLICATIONS

International Search Report dated Feb. 2, 2012 issued in PCT counterpart application No. PCT/IL2011/000756.

* cited by examiner

*Primary Examiner* — Andrea Wellington
*Assistant Examiner* — Alan Snyder
(74) *Attorney, Agent, or Firm* — Womble Carlyle (57) ABSTRACT

A rotary cutting tool has a disc-shaped tool body and a cutting insert. The cutting insert is resiliently retained by jaws having tangentially-oriented abutment surfaces and defining, together with a holding member, an insert pocket of the tool body. The holding member is configured to bend in a radially-outward direction during rotation of the tool body about the rotation axis, and to engage a stopping recess of the cutting insert to oppose dislodgement of the cutting insert from the tool body.

22 Claims, 3 Drawing Sheets

CUTTING BODY AND CUTTING INSERT HAVING A STOPPING RECESS FOR A ROTARY CUTTING TOOL

FIELD OF THE INVENTION

The subject matter of the present application relates to rotary cutting tools designed for metal-working machines and, in particular to high speed rotary cutting tools with cutting inserts which are designed to be resiliently secured by jaws of a cutting body to an insert pocket thereof.

BACKGROUND OF THE INVENTION

Rotary cutting tools for cutting inserts can include a tool body with one or more cutting insert pockets located around a periphery thereof. Such tool body can be disc-shaped and of relatively narrow thickness, usually in the range of 0.5 mm to 12 mm, and can be configured for high rotational speeds. High rotational speeds are considered to be in the range between 300 meters/minute and 6000 meters/minute. A resilient clamping mechanism can include two clamping jaws which are configured to resiliently secure a cutting insert to an insert pocket. Such cutting insert can be considered self-retaining and can be free of a bore or hole configured for receiving a fastener member. The jaws can be opened for insertion of cutting insert therein, and, when a force opening the jaws is removed, resilient or elastic properties of the cutting body can close the jaws on the cutting insert, securing it in the insert pocket.

U.S. Pat. No. 4,417,833, U.S. Pat. No. 4,558,974 and U.S. Pat. No. 7,163,361 disclose examples of such rotary cutting tools.

SUMMARY OF THE INVENTION

In accordance with a first aspect of the subject matter of the present application, there is provided a cutting insert comprising an asymmetrically shaped stopping recess.

The asymmetric shape can be present in a plan view of one of the insert side surfaces and/or a corresponding cross-sectional view.

Example features can include the cutting insert comprising: opposing insert side surfaces; opposing insert upper and lower surfaces extending between the insert side surfaces, at least a portion of the insert upper surface constituting a rake surface; opposing insert front and rear surfaces extending between the insert side surfaces and the insert upper and lower surfaces, at least a portion of the insert front surface can constitute a relief surface; a cutting edge formed at an intersection of the rake and relief surfaces; a stopping recess is located between the insert upper and lower surfaces and having an asymmetric shape; and an interposing first portion located adjacent the stopping recess and between the stopping recess and the insert lower surface.

In accordance with another aspect of the subject matter of the present application, there is provided a cutting insert comprising opposing insert side surfaces, opposing insert upper and lower surfaces extending between the insert side surfaces, and opposing insert front and rear surfaces which both extend between the insert side surfaces and the insert upper and lower surfaces. The insert front surface can comprise a front first sub-surface extending from the insert upper surface, and a front second sub-surface which is recessed relative to the front first sub-surface. The insert lower surface can comprise a lower first sub-surface extending between the insert rear surface and the front second sub-surface, and a lower second sub-surface extending between the front first sub-surface and the front second sub-surface. At least a portion of the front first sub-surface constitutes a relief surface, at least a portion of the insert upper surface constitutes a rake surface, and the cutting insert further comprises a cutting edge formed at an intersection of the rake and relief surfaces. The insert rear surface can comprise a stopping recess.

In accordance with another aspect of the subject matter of the present application, there is provided a cutting insert comprising: opposing insert side surfaces; opposing insert upper and lower surfaces extending between the insert side surfaces, at least a portion of the insert upper surface constituting a rake surface; opposing insert front and rear surfaces extending between the insert side surfaces and the insert upper and lower surfaces, at least a portion of the insert front surface constituting a relief surface, and the insert rear surface defining a common insert rear plane in a plan view of one of the insert side surfaces; a cutting edge formed at an intersection of the rake and relief surfaces; wherein: the cutting insert has a single cutting portion and is non-indexable; and the insert rear surface comprises a stopping recess located between the insert upper and lower surfaces, the stopping recess comprising: a recess stopping surface extending inwardly into the cutting insert from the insert rear surface and forming a first angle relative to the common insert rear plane; and a recess relief surface extending inwardly into the cutting insert from the insert rear surface and forming a second angle relative to the common insert rear plane.

The stopping recess (28) can have an asymmetric shape.

The first angle and the second angle can be unequal.

In accordance with yet another aspect of the subject matter of the present application, there is provided a rotary tool body having an insert pocket a holding member elongated along an insert insertion direction and configured to bend in a direction transverse to the insert insertion direction.

Example features can include the tool body being disc-shaped, configured to rotate about a rotation axis and comprising a base jaw, a clamping jaw resiliently connected to the base jaw, a holding member, and at least one peripherally located insert pocket defined by the base jaw, the clamping jaw and the holding member. The insert pocket can define insert insertion and removal directions extending along a gap located between the base jaw and the clamping jaw. The base jaw can comprise a base jaw abutment surface extending parallel to the insert insertion and removal directions. The clamping jaw can extend from the base jaw and comprise a clamping jaw abutment surface facing at least a portion of the base jaw abutment surface and extending along the insert insertion and removal directions. The clamping jaw can further comprise a clamping jaw insert stop surface extending in a transverse direction which is transversely oriented to the insert insertion and removal directions. The holding member can be configured to resiliently bend in the transverse direction, relative to at least a portion of the base jaw.

In accordance with still another aspect of the subject matter of the present application, there is provided a rotary cutting tool comprising a tool body and at least one cutting insert resiliently retained in an insert pocket of the tool body A holding member of the tool body can be partially located in a stopping recess of the cutting insert and can be configured to oppose dislodgement of the cutting insert from the tool body during rotation of the cutting tool.

The holding member of the tool body can be configured to contact the stopping recess of the cutting insert only after the cutting insert has started to dislodge from an initial clamping position. Stated differently a normal operational position of the holding member can be that it is partially located in the stopping recess and spaced-apart from the recess. During a situation where the cutting insert dislodges from the normal operational position thereof, the stopping recess moves into contact with the holding member. In other words, the holding member can constitute an auxiliary stopping mechanism.

In accordance with another aspect of the subject matter of the present application, there is provided a rotary cutting tool comprising a tool body and at least one cutting insert retained therein. The upper and lower abutment surfaces of the base jaw abut the rear locating surface of the cutting insert. The clamping surface of the clamping jaw abuts the front locating surface of the cutting insert. The holding member of the tool body can be partially located in the stopping recess of the cutting insert. The insert stop surface of the clamping jaw can abut the lower locating surface of the cutting insert. When the cutting tool is stationary, the holding member does not engage the stopping recess and, when the cutting tool rotates at high rotational speeds, the holding member is engageable with the stopping recess to reduce dislodgement movement of the cutting insert.

It is understood that the above-said is a summary, and that any of the aspects above may further comprise any of the features described in connection with any of the other aspects or described hereinbelow.

BRIEF DESCRIPTION OF THE DRAWINGS

For a better understanding of the present invention and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific details presented herein.

Figure 1:
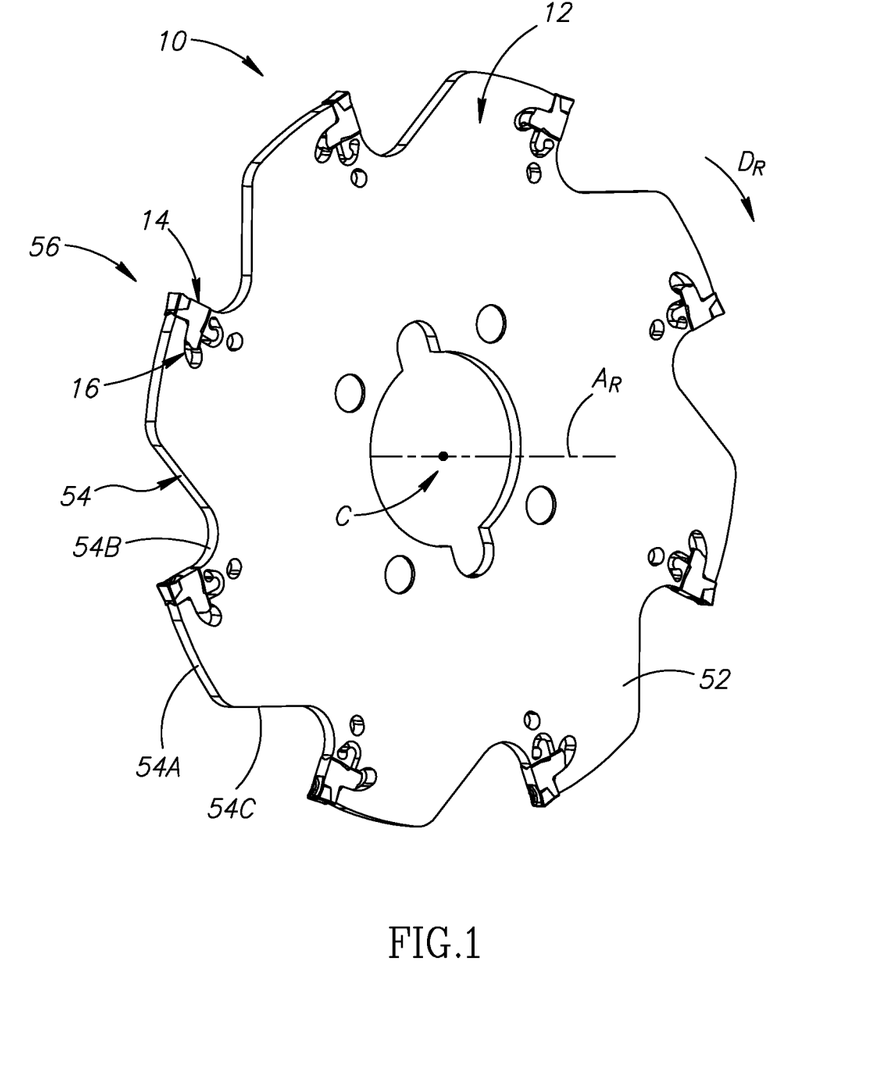
FIG. 1 is an isometric view of a rotary cutting tool.

Reference is made to FIG. 1, showing a rotary cutting tool 10, configured for, in this non-limiting example, rotary slot-cutting operations. The cutting tool 10 can include a disc-shaped tool body 12 and one or more cutting inserts 14 resiliently clamped in one or more peripherally located insert pockets 16. In this non-limiting example, the tool body 12 comprises a plurality of insert pockets 16.

Figures 2, 3, 4:
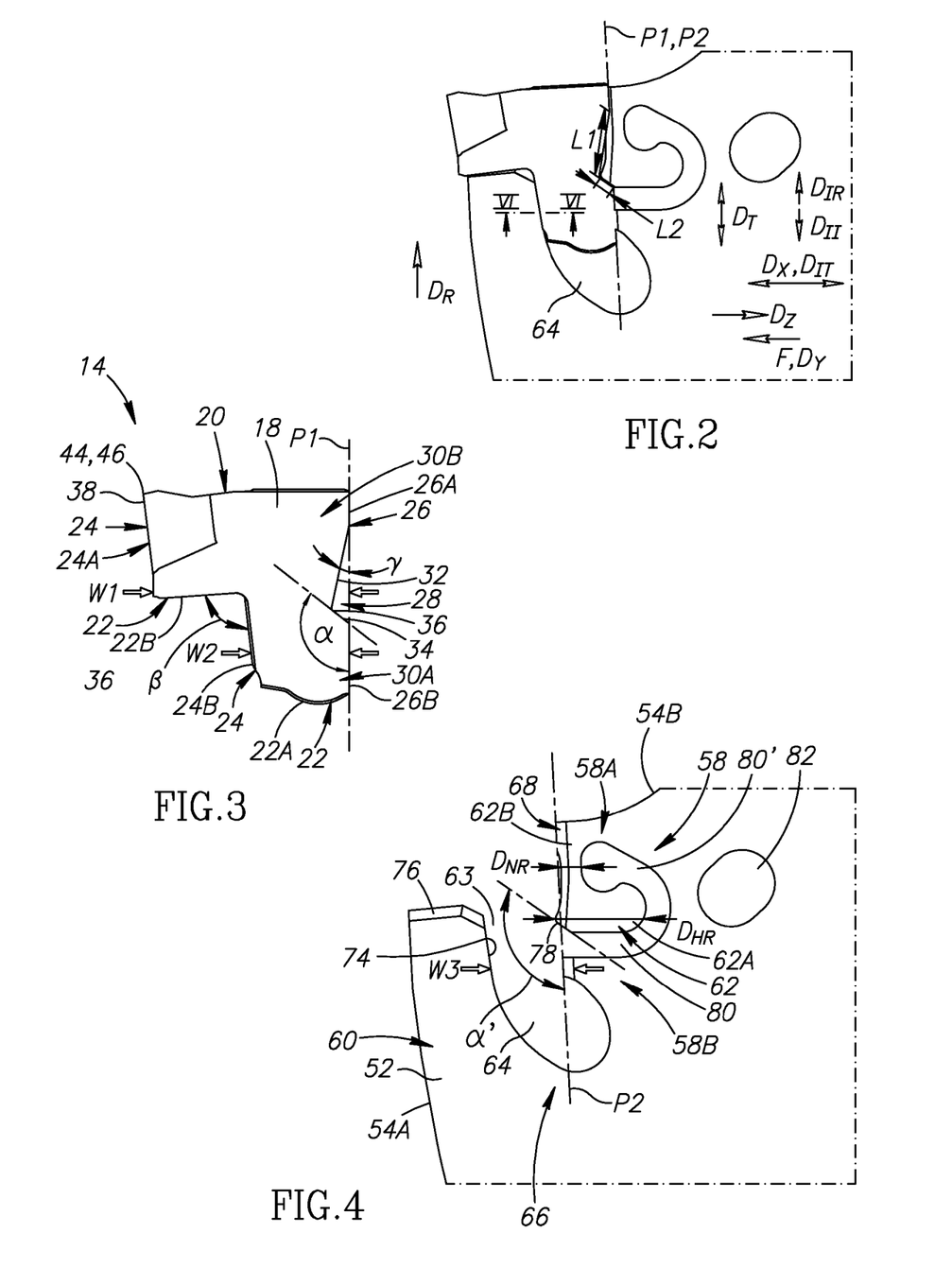
FIG. 2 is a side view of a clamping section and cutting insert of the cutting tool in FIG. 1, in a clamped position.
FIG. 3 is a side view of the cutting insert in FIGS. 1 and 2.
FIG. 4 is a side view of the clamping section in FIGS. 1 and 2.
Figures 5, 6, 7:
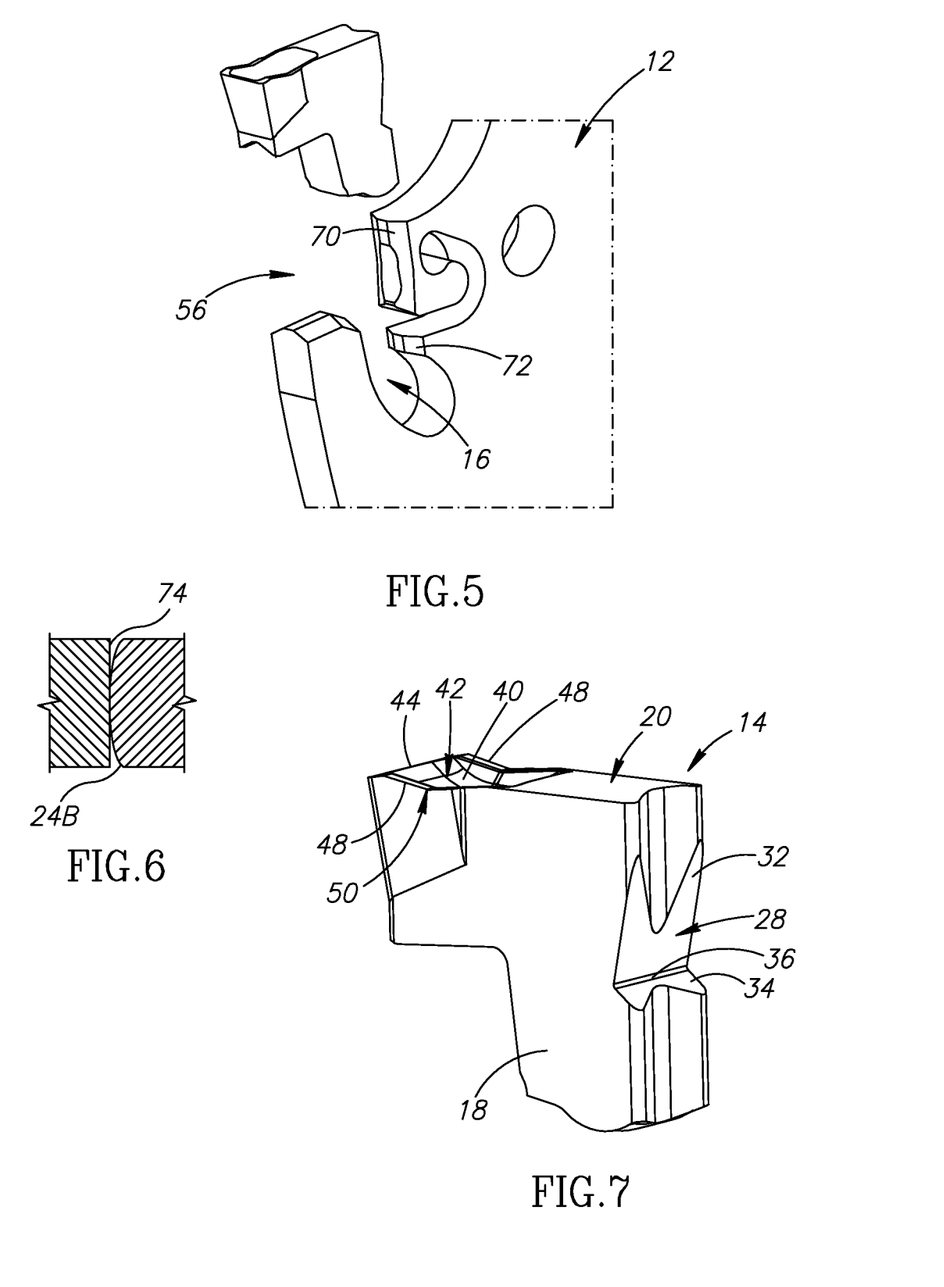
FIG. 5 is an exploded isometric view of the clamping section and cutting insert in FIGS. 1 and 2.
FIG. 6 is a partial cross sectional view taken along the line 6-6 in FIG. 2.
FIG. 7 is an isometric rear view of the cutting insert in FIGS. 1 to 3.

Referring now to FIGS. 3 and 7, the cutting insert 14 is typically manufactured, either by form-pressing or by injection molding and then sintering carbide powders in a binder.

The cutting insert 14 includes opposing insert side surfaces 18, opposing insert upper and lower surfaces 20, 22 which extend between the side surfaces 18, and opposing insert front and rear surfaces 24, 26 which both extend between the insert side surfaces 18 and the insert upper and lower surfaces 20, 22. The cutting insert 14 further comprises a stopping recess 28 located between the insert upper and lower surfaces 20, 22 and which can have, in a plan view of one of the insert side surfaces 18, an asymmetric shape. The cutting insert 14 also comprises an interposing first portion 30A of the cutting insert 14 which is located adjacent stopping recess 28 and between the stopping recess 28 and the insert lower surface 22.

The insert side surfaces 18 can be parallel.

The insert rear surface 26 can comprise rear first and second sub-surfaces 26A, 26B. The rear first sub-surface 26A can extend from the insert upper surface 20. In this non-limiting example, the rear first sub-surface 26A extends to the stopping recess 28. The rear second sub-surface 26B, can extend from the insert lower surface 22. In this non-limiting example, the rear second sub-surface 26B extends to the stopping recess 28. Stated differently, the stopping recess 28 is formed at the rear surface 26. More precisely, in this non-limiting example, the stopping recess 28 can be located between the rear first and second sub-surfaces 26A, 26B. In such case, the cutting insert 14 further comprises an interposing second portion 30B located between a recess relief surface 32 and the insert upper surface 20.

The rear first and second sub-surfaces 26A, 26B can be co-aligned. In this non-limiting example, in a plan view of either one of the insert side surfaces 18 (FIG. 3), the rear first and second sub-surfaces 26A, 26B lie along a common insert rear plane P1. More precisely, in such view, an outermost portion of the insert rear surface 26, or at least the rear second sub-surface 26B thereof, appears as a straight line which lies in the insert rear plane P1. It is understood that in another embodiment where the rear first and second sub-surfaces 26A, 26B are not co-aligned (not shown), the rear first sub-surface could still lie in the insert rear plane P1. In any case, the insert rear plane P1 can be perpendicular to the insert side surfaces 18.

The stopping recess 28 comprises a recess stopping surface 34 and can comprise the recess relief surface 32.

The recess stopping surface 34 can extend from the rear first sub-surface 26A inwardly into the cutting insert 14. The recess stopping surface 34 can, in a plan view of one of the insert side surfaces 18, follow a straight line. In a plan view of one of the insert side surfaces 18, the recess stopping surface 34 can have a recess stopping surface magnitude L2.

The recess relief surface 32 can form a vertex 36 with the recess stopping surface 34. The recess relief surface 32 can extend from the vertex 36 to the rear first sub-surface 26A. The recess relief surface 32 can, in a plan view of one of the insert side surfaces 18, follow a straight line. In a plan view of one of the insert side surfaces 18, the recess relief surface 32 can have a recess relief surface magnitude L1.

The recess stopping surface magnitude L2 is smaller than the recess relief surface magnitude L1. More precisely, the recess relief surface magnitude L1 can be greater than twice the magnitude of the recess stopping surface magnitude L2.

In a plan view of one of the insert side surfaces 18, the recess stopping surface 34 can form an internal obtuse first angle $\alpha$ with the rear first sub-surface 26A and/or the insert rear plane P1. The first angle $\alpha$ may be in the range of 110° to 150°. Preferred values for the angle $\alpha$ are in the range of 120° to 130°. In this non-limiting example, the recess stopping surface 34 is planar. More precisely, the recess stopping surface 34 extends inwardly from the rear second sub-surface 26B and extends from one of the insert side surfaces 18 to the other.

The recess relief surface 32 can form an external relief second angle γ with the insert rear plane P1. In a plan view of one of the insert side surfaces 18, the condition α>γ can be fulfilled.

It will be understood that while the described exemplary stopping recess 28 includes features which are visible in a plan view of one of the insert side surfaces (e.g. FIG. 3), such features are also present in embodiments in which the features are not visible in the aforementioned plan view. To elaborate, since the recess relief surface 32 and recess stopping surface 34 are both planar in the non-limiting example shown, a corresponding cross-sectional view of the cutting insert 14 ("corresponding" in this context meaning that the view corresponds to that of a plan view of one of the side surfaces, or, stated differently, a cross section taken along a plane which is parallel to the insert side surfaces 18) will also show, inter alia, the asymmetry and angles, etc. of the stopping recess 28. Therefore, in the non-limiting example shown, the described features of the stopping recess 28 are true for both a plan view and a corresponding cross-sectional view. It will be understood that according to some embodiments (not shown) a stopping recess might not be visible from a plan view of one of the insert side surfaces, for example in a case where the side surfaces extend on both sides of the stopping recess. In such case the above described features may be present in an embodiment which is only visible in a corresponding cross-sectional view (i.e. along a plane which is parallel to insert side surfaces of such cutting insert).

The insert front surface 24 can include a front first sub-surface 24A which extends from the insert upper surface 20, and a front second sub-surface 24B which extends from the insert lower surface 22 and is recessed relative to the front first sub-surface 24A. At least a portion of the insert front surface 24, which, in this non-limiting example, is constituted by the front first sub-surface 24A, can constitute a relief surface 38. The relief surface 38 can be adjacent to the insert upper surface 20. The relief surface 38 can be configured as a relief surface, for example, by slanting thereof (best seen in FIG. 3), such that it approaches the insert rear surface 26 with increasing distance from the insert upper surface 20.

At least a portion of the insert upper surface 20 constitutes a rake surface 40. The portion constituting the rake surface 40 is adjacent to the relief surface 38. The rake surface 40 can be configured as a rake surface by comprising a chip-control arrangement 42 (FIG. 7). In this non-limiting example, the chip-control arrangement 42 is constituted by a recess. It is understood that a chip-control arrangement can be configured for controlling chip flow and, if desired, chip breaking.

The cutting insert 14 can further include a cutting edge 44 formed at an intersection 46 of the rake surface 40 and the relief surface 38. The cutting edge 44 can also comprise cutting edge side portions 48, extending from the intersection 46 to a side intersection 50 of the insert side surfaces 18 and the rake surface 40.

The insert lower surface 22 can include a lower first sub-surface 22A which extends between the insert rear surface 26 and the front second sub-surface 24B, and a lower second sub-surface 22B which extends between the front first sub-surface 24A and the front second sub-surface 24B. More precisely, the lower first sub-surface 22A can extend between the rear second sub-surface 26B and the front second sub-surface 24B. At least a portion of the insert rear surface 26, which in this non-limiting example is constituted by both the rear first and second sub-surfaces 26A, 26B, and at least a portion of the lower second sub-surface 22B, can each be configured as locating surfaces. More precisely, the locating surfaces are configured as locating surfaces by having the shape of a ridge or, in this non-limiting example a convex shape, for facilitating precise location of the cutting insert 14 in an insert pocket 16. To elaborate, the term "locating" is used to describe a surface-to-surface mating arrangement, in which a locating surface is configured to mate with a complementary locating surface (for example one locating surface having a convex shape and the complementary surface having a concave shape), in order to prevent the cutting insert 14 from moving in a direction perpendicular to the insert side surfaces 18.

In this non-limiting example, in a plan view of one of the insert side surfaces 18:

The lower second sub-surface 22B and the front second sub-surface 24B form an external insert angle β. The external insert angle β can fulfill the condition $60° \leq \beta \leq 120°$, preferably, the condition can be $80° \leq \beta \leq 95°$ as shown in the present example (in which the external insert angle β is about 92°, and the front second sub-surface 24B and the insert rear surface 26 converge as they approach the first lower sub-surface 22A), and still more preferably, the condition can be $80° \leq \beta < 90°$ for providing a more secure clamping arrangement. In all cases, the cutting insert 14 can be r-shaped (as shown, for example, when viewing FIG. 3 rotated 90° counterclockwise). Such r-shape being differentiated from, for example, I-shaped inserts which, at least, do not have a corresponding surfaces forming an external insert angle β fulfilling the condition $60° \leq \beta \leq 120°$.

An insert first width dimension W1 of the cutting insert 14 is defined between the front first sub-surface 24A and the rear first sub-surface 26A, and an insert second width dimension W2 is defined between the front second sub-surface 24B and the rear second sub-surface 26B. While both the insert first and second width dimensions W1, W2 may vary, the smallest magnitude of the insert first width dimension W1 can be greater than any magnitude of the insert second width dimension W2.

Furthermore, the cutting insert 14 has a single cutting portion and is non-indexable, i.e., it cannot be rotated, reversed, etc. to present a new, unused cutting portion.

Referring to FIGS. 1, 2 and 4, the tool body 12 is disc-shaped and comprises opposing tool body side surfaces 52, a tool body peripheral surface 54 extending therebetween, and one or more peripherally located clamping sections 56.

The tool body 12 is configured to rotate about a rotation axis $A_R$. Rotation axis $A_R$ is oriented perpendicular to the tool body side surfaces 52 and extends through a center point C of the cutting tool 10. A direction of rotation $D_R$ is shown, as are radial and tangential directions, $D_X$, $D_T$ of the tool body 12. The radial direction $D_X$ can further be divided into radially-outward and radially-inward directions $D_Y$, $D_Z$.

Each clamping section 56 can include a first peripheral sub-surface 54A extending in the tangential direction $D_T$ and second and third peripheral sub-surfaces 54B, 54C, extending in directions transverse to the direction of the first peripheral sub-surface 54A.

More precisely, each clamping section 56 comprises a base jaw 58, a clamping jaw 60 resiliently connected to the base jaw 58, a holding member 62, and at least one peripherally located insert pocket 16.

Each insert pocket 16 can be located at the peripheral surface 54, between the first and second peripheral sub-surfaces 54A, 54B.

Each insert pocket 16 can be defined by the base jaw 58, the clamping jaw 60, and the holding member 62.

A gap 63 (FIG. 4), located between the base jaw 58 and the clamping jaw 60, defines insert insertion and removal directions $D_{II}$, $D_{IR}$ (FIG. 2). In this non-limiting example, the insert insertion and removal directions $D_{II}$, $D_{IR}$ extend parallel to the tangential direction $D_T$. For ease of reading, the term tangential direction $D_T$ will be used in the following description, however it will be understood that this term may be interchangeable with the terms insert insertion and removal directions $D_{II}$, $D_{IR}$. Further, a plane P2 can be defined as perpendicular to the insert side surfaces 18 and parallel to the tangential direction $D_T$.

The gap 63 can further comprise a recess portion 64 disposed adjacent a connection area 66 of the base jaw 58 and the clamping jaw 60.

The base jaw 58 comprises a base jaw abutment surface 68 extending parallel to the tangential direction $D_T$. The base jaw 58 can include an upper portion 58A which extends from the third peripheral sub-surface 54C and a lower portion 58B. The base jaw abutment surface 68 can include a base jaw upper abutment sub-surface 70 located in the base jaw's upper portion 58A and a base jaw lower abutment sub-surface 72 located in the base jaw's lower portion 58B. The base jaw upper and lower abutment sub-surfaces 70, 72 can be co-aligned. In a plan view of the tool body side surfaces 52, a forward-most portion of the base jaw lower abutment sub-surface 72 can follow a straight line and lie in the plane P2 (as shown in FIGS. 2 and 4)

The clamping jaw 60 extends from the base jaw 58 and comprises a clamping jaw abutment surface 74 facing at least a portion of the base jaw abutment surface 68 and extending along the tangential direction $D_T$. The clamping jaw 60 can further comprise a clamping jaw insert stop surface 76 extending in a transverse direction $D_{IT}$, which is transversely oriented relative to the insert insertion and removal directions $D_{II}$, $D_{IR}$. In this non-limiting example, the tangential direction $D_T$ extends perpendicular to the radial direction $D_X$. For ease of reading, the term tangential direction $D_T$ may be used in the following description, however it will be understood that this term may be interchangeable with the terms insert insertion and removal directions $D_{II}$, $D_{IR}$. More precisely, the clamping jaw insert stop surface 76 can be located at an extremity of the clamping jaw 60 and can extend between the first peripheral sub-surface 54A and the clamping surface 74. The clamping jaw insert stop surface 76, and in this non-limiting example, both of the base jaw upper and lower abutment sub-surfaces 70, 72 can be configured as locating surfaces. Such locating configuration can be the same as that described above with respect to the cutting insert 14, except having a complementary configuration for engagement therewith.

In a plan view of one of the tool body side surfaces 52, a tool body width dimension W3 is defined in the radial direction $D_X$ and extends between the clamping jaw abutment surface 74 and the plane P2. The tool body width dimension W3 decreases with increased proximity to the connection area 66 between the base jaw 58 and the clamping jaw 60.

The holding member 62, which is connected to the base jaw 58, can be configured to resiliently bend in the radial direction $D_X$. In other words the holding member 62 can be a resiliently movable holding member. More precisely, the holding member 62 comprises a head portion 62A and a flexible and elastic neck portion 62B connected between the head portion 62A and the base jaw 58. The holding member 62, due to its elastic neck portion 62B, is resiliently displaceable relative to other portions of the base jaw 58, such as the upper portion 58A and the lower portion 58B of the base jaw 58, in the radial direction $D_X$.

The head portion 62A can be elongated relative to the radial direction $D_X$. The head portion 62A can further comprise a holding surface 78.

The holding surface 78 can be oriented slanted with respect to tangential and radial directions $D_T$, $D_X$ at a holding surface internal angle α'. The holding surface 78 can face towards the recess portion 64. The holding surface 78 can form the holding surface internal angle α' with the plane P2. In accordance with some embodiments the holding surface internal angle α' may be in the range from 110° to 150°. Preferred values for the holding surface internal angle α' are in the range of 120° to 130°. In accordance with some embodiments, the angles α, α' may be equal in value. In accordance with some embodiments, the angles α, α' may have different values. The holding surface 78 can be configured to normally be the closest part of the head portion 62A to the clamping jaw 60 (other than at the connection area 66). In other words, it is the closest part in a state where a cutting insert 14 is not being inserted or removed from the insert pocket 16.

The head portion 62A, as seen from a plan view of the insert side surfaces 18, can be elongated and could be considered to be shoe-shaped. Extending around the head portion 62A is an elongated and curved recess 80 which is located between the base jaw's upper and lower portions 58A, 58B. The elongated curved recess 80 extends from a point adjacent the base jaw lower abutment sub-surface 72 and terminates in an enlarged portion 80' adjacent the neck portion 62B.

The neck portion 62B can be elongated along the tangential direction $D_T$. Stated differently, the largest dimension of the neck portion 62B can be measured in the tangential direction $D_T$. The neck portion 62B can be connected to a region of the upper portion 58A adjacent third peripheral sub-surface 54C.

The neck portion 62B has a neck dimension $D_{NR}$ and the head portion 62A has a head dimension $D_{HR}$ parallel thereto. Both the neck dimension $D_{NR}$ and the head dimension $D_{HR}$ are oriented along the radial direction $D_X$ and the head dimension $D_{HR}$ can have a magnitude greater than that of the neck dimension $D_{NR}$. Preferably, the head dimension $D_{HR}$ can have a magnitude at least twice that of the neck dimension $D_{NR}$. More preferably, the head dimension $D_{HR}$ can have a magnitude at least three times that of the neck mass $M_{NM}$.

The neck portion 62B has a neck mass $M_{NM}$ (not shown) and the head portion 62A has a head mass $M_{HM}$ (not shown) which can have a magnitude greater than that of the neck mass $M_{NM}$. Preferably, the head mass $M_{HM}$ can have a magnitude at least twice that of the neck mass $M_{NM}$. More preferably, the head mass $M_{HM}$ can have a magnitude at least three times that of the neck mass $M_{NM}$. It will be understood that the head mass $M_{HM}$ having a greater magnitude can assist it to move in the radially-outward direction $D_Y$ under the influence of centrifugal forces during rotation of the tool body 12.

A hole 82 can be formed in the clamping section 56. The hole 82 can open out to both tool body side surfaces 52 and can be located rearwardly of the base jaw 58. The hole 82 can be configured to receive a tool configured to aid insertion or removal of a cutting insert.

Referring to FIGS. 2 and 5, the cutting insert 14 can be resiliently retained in the insert pocket 16 by the base jaw 58 and clamping jaw 60, and the holding member 62 is positioned to abut the stopping recess 28 to oppose dislodgement of the cutting insert 14 from the tool body 12. It is noticed in FIG. 2 that the recess stopping surface 34 is spaced-apart (an extremely small distance) from the stopping recess 28.

More precisely, in a normal retained or clamping position of the cutting insert 14, the base jaw upper and lower abutment sub-surfaces 70, 72 can simultaneously abut the insert rear surface 26 of the cutting insert 14, the clamping jaw abutment surface 74 can abut the front second sub-surface 24B of the cutting insert 14, and the clamping jaw insert stop surface 76 can abut the cutting insert's 14 lower second sub-surface 22B.

To insert the cutting insert 14 into the pocket 16, the cutting insert 14 is moved in the insert direction $D_{II}$, during which movement the rear second sub-surface 26B abuts the head portion 62A and moves it in the radially-inward direction $D_Z$. The insert second width dimension W2 has a greater magnitude than the tool body width dimension W3, resulting in the clamping jaw 60 resiliently moving in the radially-outward direction $D_Y$ until the cutting insert 14 is brought to a clamped position. Movement of the cutting insert 14 in the insertion direction $D_{II}$, is stopped when the clamping jaw insert stop surface 76 abuts the cutting insert's 14 lower second sub-surface 22B. In the clamped position, after the rear second sub-surface 26B passes the head portion 62A, the head portion 62A resiliently moves in the radially-outward direction $D_Y$ and the recess stopping surface 34 moves towards but does not touch the holding surface 78.

During rotation of the cutting tool 10 at high rotational speeds, a centrifugal force F (FIG. 2) urges the holding member 62 in the radially-outward direction $D_Y$, i.e. in the same direction indicated by the arrow F, of the tool body 12.

If the cutting insert 14 starts to be dislodged from the insert pocket 16, the recess stopping surface 34 abuts the holding surface 78 and assists in reducing dislodgement movement. It will be understood that at high enough speeds any insert can be dislodged from a resilient clamping arrangement, however the subject matter of the present application has been found to reduce dislodgment movement of a cutting insert in a tool body having the holding member 62 when compared with a cutting insert held by a tool body without such holding member 62 and rotated under identical conditions.

With increasing mass of the holding member 62, and in particular the head portion 62A thereof, greater force F can be applied by the holding member 62 against the recess stopping surface 34. Such force is increased with increasing rotational speed of the tool body 12.

It is further noted that the neck portion 62B is elongated along the insert removal direction $D_{IR}$ and therefore can comprise a reinforced construction opposing a direction in which the cutting insert 14 moves while dislodging (or being transversely oriented to the recess stopping surface 34 and/or the holding surface 78). Further such neck portion 62B may only be subject to compression forces and may be devoid of potentially weakening bending forces while opposing dislodgement of a cutting insert 14.

It is understood that the asymmetric shape of the stopping recess 28 allows the recess stopping surface 34 and holding surface 78 to each be at a desired angle, while facilitating the elongated neck portion 62B to be partially located in the stopping recess 28. Such partial location is further facilitated by the elongated shape of the recess relief surface 32. More precisely, such angle of the recess stopping surface 34 is preferred as it is transverse to the insert removal direction $D_{IR}$ for opposing movement of the cutting insert 14 in that direction, while not being perpendicular to the insert removal direction $D_{IR}$ which can, in some cases, possibly inhibit removal of the cutting insert 14 when removal is desired.

One possible advantage of the subject matter described above, is that a cutting insert can be positively secured in an insert pocket without undesired shift or dislocation in the insert pocket during cutting operations. Such arrangement could possibly facilitate accurate machining during rotational motion.

To replace the cutting insert 14, a tool (not shown) can be inserted into the hole 82 and recess portion 64 and rotated to assist spacing apart the base jaw 58 from the clamping jaw 60, and the recess stopping surface 34 from the holding surface 78. Subsequently, the cutting insert 14 can be moved in the insert removal direction $D_{IR}$.

When the cutting tool 10 is static, the angle range of α and/or α' can assist removal of the cutting insert 14, since it allows pushing the holding member 62 in the radially-inward direction $D_Z$, when removing the cutting insert 14 from the pocket.

While the subject matter of the present application has been described with reference to one or more specific embodiments, the description is intended to be illustrative as a whole and is not to be construed as limited to the embodiments shown. It is appreciated that various modifications may occur to those skilled in the art that, while not specifically shown herein, are nevertheless within the scope of the subject matter of the present application.

What is claimed is:

1. A cutting insert (14) comprising:
    opposing insert side surfaces (18);
    opposing insert upper and lower surfaces (20, 22) extending between the insert side surfaces (18), at least a portion of the insert upper surface (20) constituting a rake surface (40);
    opposing insert front and rear surfaces (24, 26) extending between the insert side surfaces (18) and the insert upper and lower surfaces (20, 22), at least a portion of the insert front surface (24) constituting a relief surface (38);
    a cutting edge (44) formed at an intersection of the rake and relief surfaces (40, 38);
    a stopping recess (28) located between the insert upper and lower surfaces (20, 22) and having an asymmetric shape; and
    an interposing first portion (30A) located adjacent the stopping recess (28) and between the stopping recess (28) and the insert lower surface (22), wherein:
    the insert front surface (24) comprises:
        a front first sub-surface (24A) extending from the insert upper surface (20), and
        a front second sub-surface (24B) which is recessed relative to the front first sub-surface (24A);
    the insert lower surface (22) comprises:
        a lower first sub-surface (22A) extending between the insert rear surface (26) and the front second sub-surface (24B), and
        a lower second sub-surface (22B) extending between the front first sub-surface (24A) and the front second sub-surface (24B);
    the insert rear surface (26) comprises:
        a rear first sub-surface (26A) extending from the insert upper surface (20), and
        a rear second sub-surface (26B) extending from the lower first sub-surface (22A) and following a straight line in a plan view of one of the insert side surfaces (18);
    wherein the stopping recess (28) is located between the rear first and second sub-surfaces (26A, 26B).

2. The cutting insert (14) according to claim 1, wherein the stopping recess (28) further comprises a recess stopping surface (34) extending from the rear first sub-surface (26A) and forming an internal insert obtuse angle (a) therewith which fulfills the condition $110° \leq \alpha \leq 150°$ in a plan view of one of the insert side surfaces (18) and/or a corresponding cross-sectional view.

3. The cutting insert (14) according to claim 2, wherein, in a plan view of one of the insert side surfaces (18) and/or a corresponding cross-sectional view, the recess stopping surface (34) follows a straight line.

4. The cutting insert (14) according to claim 1, wherein, in a plan view of one of the insert side surfaces (18), an insert first width dimension (W1) is defined between the front first sub-surface (24A) and the rear first sub-surface (26A), and an insert second width dimension (W2) is defined between the front second sub-surface (24B) and the rear second sub-surface (26B), and the smallest magnitude of the insert first width dimension (W1) is greater than any magnitude of the insert second width dimension (W2).

5. The cutting insert (14) according to claim 1, wherein at least a portion of the insert rear surface (26) and at least a portion of the lower second sub-surface (22B), are configured as locating surfaces.

6. The cutting insert (14) according to claim 1, wherein the rear first and second sub-surfaces (26A, 26B) lie along a common insert rear plane (P1) oriented perpendicular to both of the insert side surfaces (18).

7. A cutting insert (14) comprising:
opposing insert side surfaces (18);
opposing insert upper and lower surfaces (20, 22) extending between the insert side surfaces (18), at least a portion of the insert upper surface (20) constituting a rake surface (40);
opposing insert front and rear surfaces (24, 26) extending between the insert side surfaces (18) and the insert upper and lower surfaces (20, 22), at least a portion of the insert front surface (24) constituting a relief surface (38);
a cutting edge (44) formed at an intersection of the rake and relief surfaces (40, 38);
a stopping recess (28) located between the insert upper and lower surfaces (20, 22) and having an asymmetric shape; and
an interposing first portion (30A) located adjacent the stopping recess (28) and between the stopping recess (28) and the insert lower surface (22),
wherein the stopping recess (28) further comprises
a recess stopping surface (34) extending into the cutting insert (14) from the rear surface (26), and
a recess relief surface (32);
wherein, in a plan view of one of the insert side surfaces (18) and/or a corresponding cross-sectional view,
the recess relief surface (32) has a recess relief surface magnitude L1, and
the recess stopping surface (34) has a recess stopping surface magnitude L2 which is smaller than the recess relief surface magnitude L1.

8. The cutting insert (14) according to claim 7, wherein, in a plan view of one of the insert side surfaces (18), the cutting insert (14) is r-shaped.

9. The cutting insert (14) according to claim 7, wherein the recess relief surface magnitude L1 is at least twice the magnitude of the recess stopping surface magnitude L2.

10. The cutting insert (14) according to claim 7, wherein, in a plan view of one of the insert side surfaces (18) and/or a corresponding cross-sectional view, the recess relief surface (32) follows a straight line.

11. The cutting insert (14) according to claim 7, wherein the recess stopping surface (34) extends from the rear first sub-surface (26A) at an internal insert obtuse angle (α) therewith and wherein the recess relief surface (32) forms an external relief angle (γ) with an insert rear plane P1 upon which the rear second sub-surface (26B) lies and which is perpendicular to both of the insert side surfaces (18); wherein, in a plan view of one of the insert side surfaces (18) and/or a corresponding cross-sectional view, the condition α>γ is fulfilled.

12. The cutting insert (14) according to claim 7, wherein there is an interposing second portion (30B) located between the recess relief surface (32) and the insert upper surface (20).

13. The cutting insert (14) according to 7, wherein the stopping recess' (28) asymmetric shape is in a plan view of one of the insert side surfaces (18) and/or a corresponding cross-sectional view.

14. A tool body (12) being disc-shaped, configured to rotate about a rotation axis (AR) and comprising
a base jaw (58),
a clamping jaw (60) resiliently connected to the base jaw (58),
a holding member (62), and
at least one peripherally located insert pocket (16) defined by the base jaw (58), the clamping jaw (60) and the holding member (62) and defining insert insertion and removal directions (DII, DIR) extending along a gap (63) located between the base jaw (58) and the clamping jaw (60);
the base jaw (58) comprising a base jaw abutment surface (68) extending parallel to the insert insertion and removal directions (DII, DIR);
the clamping jaw (60) extending from the base jaw (58) and comprising a clamping jaw abutment surface (74) facing at least a portion of the base jaw abutment surface (68) and extending along the insert insertion and removal directions (DII, DIR), and
further comprising a clamping jaw insert stop surface (76) extending in a transverse direction (DIT) which is transversely oriented to the insert insertion and removal directions (DII, DIR); and
the holding member (62) being configured to resiliently bend in the transverse direction (DIT), relative to at least a portion of the base jaw (58), wherein
the insert insertion and removal directions (DII, DIR) extend parallel to a tangential direction (DT), relative to the disc-shape, of the tool body (12) and said transverse direction (DIT) extends parallel to a radial direction (Dx), relative to the disc-shape, of the tool body (12).

15. The tool body (12) according to claim 14, wherein the holding member (62) comprises a head portion (62A) and a flexible and elastic neck portion (62B) connected between the head portion (62A) and the base jaw (58).

16. The tool body (12) according to claim 15, wherein the neck portion (62B) is elongated along the insert insertion and removal directions (DII, DIR).

17. The tool body (12) according to claim 15, wherein the head portion (62A) is elongated relative to the transverse direction (DIT).

18. The tool body (12) according to claim 15, wherein the neck portion (62B) has a neck dimension (DNR) and the head portion (62A) has a head dimension (DHR) parallel thereto, both the neck dimension (DNR) and the head dimension (DHR) being oriented along the transverse direction (DIT) and the head dimension (DHR) having a magnitude at least twice as great as that of the neck dimension (DNR).

19. The tool body (12) according to claim 15, wherein the neck portion (62B) has a neck mass (MNM) and the head portion (62A) has a head mass (MHM) having a magnitude at least twice as that of the neck mass (MNM).

20. The tool body (12) according to claim 15, wherein head portion (62A) further comprises a holding surface (78) which, when the tool body (12) is not being rotated, is oriented slanted with respect to tangential and radial directions (DT, DX) of the tool body (12) at a holding surface internal angle (α'); the holding surface (78) being configured to normally be the closest part of the head portion (62A) to the clamping jaw (60).

21. A rotary cutting tool (10) comprising, in combination, the tool body (12) according to claim 14, and
at least one cutting insert (14), according to claim 1, resiliently retained in the insert pocket (16) of the tool body (12).

22. The rotary cutting tool (10) according to claim 21, wherein:
the holding member (62) is partially located in the stopping recess (28) and is configured to oppose dislodgement of the cutting insert (14) from the tool body (12) during rotation of the cutting tool (10).

* * * * *